(12) United States Patent
Guess et al.

(10) Patent No.: US 8,031,589 B2
(45) Date of Patent: Oct. 4, 2011

(54) METROPOLITAN AREA LOCAL ACCESS SERVICE SYSTEM

(75) Inventors: Michael Guess, Austin, TX (US); Paul Niezgoda, Austin, TX (US); Fraser Street, San Jose, CA (US)

(73) Assignee: Qwest Communications International Inc, Denver, CO (US)

( * ) Notice: Subject to any disclaimer, the term of this patent is extended or adjusted under 35 U.S.C. 154(b) by 321 days.

(21) Appl. No.: 11/087,938

(22) Filed: Mar. 23, 2005

(65) Prior Publication Data

US 2005/0180339 A1  Aug. 18, 2005

Related U.S. Application Data

(62) Division of application No. 09/952,284, filed on Sep. 12, 2001.

(51) Int. Cl.
  *G01R 31/08*  (2006.01)
(52) U.S. Cl. .................... 370/220; 370/216; 370/223
(58) Field of Classification Search .............. 370/216, 370/217, 218, 219, 220, 223, 227, 228
  See application file for complete search history.

(56) References Cited

U.S. PATENT DOCUMENTS

| | | | |
|---|---|---|---|
| 4,871,225 A | 10/1989 | Schembri | |
| 5,107,490 A | 4/1992 | Wilson et al. | |
| 5,418,785 A | 5/1995 | Olshansky et al. | |
| 5,530,782 A | 6/1996 | Osaka et al. | |
| 5,796,501 A | 8/1998 | Sotom et al. | |
| 5,835,696 A | 11/1998 | Hess | |
| 5,920,410 A | 7/1999 | Smith et al. | |
| 6,088,328 A | 7/2000 | McKnight | |
| 6,108,300 A | 8/2000 | Colie et al. | |
| 6,205,144 B1 | 3/2001 | Mohrmann | |
| 6,236,640 B1 | 5/2001 | Klink | |
| 6,330,229 B1 | 12/2001 | Jain et al. | |
| 6,415,323 B1 * | 7/2002 | McCanne et al. | 709/225 |
| 6,470,032 B2 | 10/2002 | Dudziak et al. | |
| 6,519,399 B2 | 2/2003 | Strong et al. | |
| 6,539,022 B1 | 3/2003 | Virgile | |
| 6,565,269 B2 | 5/2003 | Riis et al. | |
| 6,654,379 B1 | 11/2003 | Grover et al. | |
| 6,751,191 B1 * | 6/2004 | Davar et al. | 370/217 |

(Continued)

FOREIGN PATENT DOCUMENTS

EP  0 538 853  4/1993

(Continued)

OTHER PUBLICATIONS

Extreme Networks: "Extremere Software User Guide", Software Version 6.1, Apr. 2000, Chapter 6 and Chapter 10.*

(Continued)

*Primary Examiner* — Kwang B Yao
*Assistant Examiner* — Nguyen Ngo

(57) ABSTRACT

A local access fiber optical distribution network is disclosed in which a dedicated pair of diversely routed optical fibers is routed in the distribution network for each customer. In a preferred embodiment, a dual physical overlay ring core topology is used in the core. The distribution network includes working and protection logical path connectivity. No 802.1D Spanning Tree is required for recovery, providing resilience to any single network failure in any device or link, quick recovery times from failure, and a failure detection/recovery protocol that is not active on any devices other than the devices directly attached to the subscriber.

9 Claims, 6 Drawing Sheets

U.S. PATENT DOCUMENTS

| | | | |
|---|---|---|---|
| 6,766,482 B1 | 7/2004 | Yip et al. | |
| 6,826,158 B2 | 11/2004 | Seaman et al. | |
| 6,834,056 B2 | 12/2004 | Hayes | |
| 6,963,575 B1* | 11/2005 | Sistanizadeh et al. | 370/404 |
| 7,009,933 B2* | 3/2006 | Gan | 370/226 |
| 7,126,923 B1* | 10/2006 | Yang et al. | 370/256 |
| 7,164,698 B1 | 1/2007 | Krishnamurthi et al. | |
| 7,246,168 B1 | 7/2007 | Bales | |
| 7,289,428 B2 | 10/2007 | Chow et al. | |
| 2003/0012129 A1* | 1/2003 | Lee et al. | 370/216 |
| 2003/0012238 A1 | 1/2003 | Wu | |
| 2003/0016624 A1* | 1/2003 | Bare | 370/217 |
| 2003/0043736 A1* | 3/2003 | Gonda | 370/218 |
| 2003/0179700 A1 | 9/2003 | Saleh et al. | |
| 2004/0081093 A1 | 4/2004 | Haddock et al. | |
| 2006/0051090 A1* | 3/2006 | Saniee et al. | 398/59 |

FOREIGN PATENT DOCUMENTS

EP  0 987 857  3/2000

OTHER PUBLICATIONS

Extreme Networks: "ExtremeWare Software User Guide", Software Version 6.1, Apr. 2000, p. 1-1.*
Extreme Networks: "ExtremeWare Software User Guide", Software Version 6.1, Apr. 2000.*
Yoshio Kajiyama et al., "An ATM VP-based Self-Healing Ring)" IEEE Journal on Selected Areas in Communications, IEEE Inc., New York, vol. 12, No. 1, 1994.
Extreme Networks, "ExtremeWare Software User Guide", "Software Version 6.1", Apr. 2000.
"Final Office Action in U.S. Appl. No. 09/975,474", May 4, 2009, Publisher: USPTO, Published in: US.
"Final Office Action Mailed Apr. 14, 2009 in U.S. Appl. No. 09/652,284", Apr. 13, 2009, Publisher: USPTO, Published in: US.
"Office Actin Mailed Jan. 18, 2008", Publisher: USPTO, Published in: US.
"Office Action Maile Mar. 14, 2006", Publisher: USPTO, Published in: US.
"Office Action Mailed Jun. 27, 2007", Publisher: USPTO, Published in: US.
"Office Action Mailed Jul. 21, 2005", Publisher: USPTO, Published in: US.
"Office Action Mailed Jul. 24, 2008", Publisher: USPTO, Published in: US.
"Office Action Mailed Oct. 4, 2006", Publisher: USPTO, Published in: US.
"Office Action Mailed Mar. 26, 2008", Publisher: USPTO, Published in: US.
"Office Action mailed Apr. 13, 2007", Publisher: USPTO, Published in: US.
"Office Action mailed Jun. 23, 2004 in U.S. Appl. No. 09/952,284", Publisher: USPTO, Published in: US.
"Office Action mailed Jul. 31, 2007 in U.S. Appl. No. 09/952,284", Publisher: USPTO, Published in: US.
"Office Action mailed Aug. 9, 2006 in U.S. Appl. No. 09/952,284", Publisher: USPTO, Published in: US.
"Office Action mailed Oct. 8, 2008 in U.S. Appl. No. 09/952,284", Publisher: USPTO, Published in: US.
"Office Action Mailed Nov. 3, 2004 in U.S. Appl. No. 09/952,284", Publisher: USPTO, Published in: US.
"Office Action Mailed Jan. 11, 2008 in U.S. Appl. No. 09/952,284", Publisher: USPTO, Published in: US.
Andrew G. Dinovo, "Preliminary Amendment in Response to Office Action Dated Mar. 14, 2006 in U.S. Appl. No. 09/975,474", Published in: US.
Andrew G. Dinovo, "Amendment in Response to Office Action Dated Jun. 27, 2007 in U.S. Appl. No. 09/975,474", Oct. 29, 2007, Published in: US.
Andrew G. Dinovo, "Amendment in Response to Non-Final Office Action in U.S. Appl. No. 09/975,474", Dec. 21, 2005, Published in: US.
Andrew G. Dinovo, "Amendment and Response to Final Office Action Dated Jul. 24, 2008 in U.S. Appl. No. 09/975,474", Oct. 24, 2008, Published in: US.
Andrew G. Dinovo, "Amendment in Response to Non-Final Office Action Dated Oct. 4, 2006 in U.S. Appl. No. 09/975,474", Mar. 30, 2007, Published in: US.
Andrew G. Dinovo, "In connection with the Amendment and RCE filed on Oct. 30, 2007 and response to OA dated Jan. 11, 2008 in U.S. Appl. No. 09/952,284", Jan. 21, 2008, Published in: US.
Andrew G. Divovo, "Response to Non-Final Office Action in U.S. Appl. No. 09/952,284", Jul. 28, 2008, Published in: US.
Andrew G. Dinovo, "Response to Office Action and Notice of Non-Compliant Amendment in U.S. Appl. No. 09/952,284", May 2007, Published in: US.
Andrew G. Dinovo, "Amendment in U.S. Appl. No. 09/952,284", Oct. 2007, Published in: US.
Andrew D. Dinovo, "Amendment in Response to Office Action Dated Jan. 18, 2008 in U.S. Appl. No. 09/975,474", Apr. 18, 2008, Published in: US.
Andrew G. Dinovo, "Response to Jun. 23, 2004 Restriction Requirement in U.S. Appl. No. 09/952,284", Jul. 2004, Published in: US.
Andrew G. Dinovo, "Amendment in Response to Non-Final Office Action in U.S. Appl. No. 09/952,284", Feb. 2007, Published in: US.
Andrew G. Dinovo, "Response to Office Action dated Nov. 3, 2004 in U.S. Appl. No. 09/952,284", Nov. 2004, Published in: US.
Neugeboren O'Dowd PC, "Response to Office Action in U.S. Appl. No. 09/952,284", Feb. 9, 2009, Published in: US.
Neugeboren O'Dowd PC, "Response to Office Action in U.S. Appl. No. 09/975,474", Apr. 3, 2009, Published in: US.
East Search Report, Apr. 10, 2009, 1 page.
U.S. Appl. No. 09/975,474, Office Action dated Jan. 5, 2009, 13 pages.

* cited by examiner

METROPOLITAN AREA LOCAL ACCESS SERVICE SYSTEM

CROSS REFERENCE TO RELATED APPLICATIONS

This application is a divisional of U.S. Ser. No. 09/952,284, filed on Sep. 12, 2001.

FIELD OF THE INVENTION

The invention generally relates to the field of fiber optic communications networks, and more particularly to a new system and method for deploying and operating a metropolitan area local access distribution network.

RELATED ART

The growth of the Internet has created unprecedented demand for high-speed broadband connectivity in telecommunications networks. However, access connections between corporate Local Area Networks ("LANs") and existing service provider networks, such as those operated by long-haul carriers and Internet Service Providers ("ISPs"), generally have been limited to relatively slow, hard to provision T1 (1.5 Mbps) or DS-3 (45 Mbps) data speeds due to infrastructure limitations in most metropolitan areas.

The lack of bandwidth throughout metropolitan areas is a function, principally, of two independent factors. First, there is a deficiency in high speed fiber optic access rings and/or fiber optic "tails" into major buildings in metro areas. Second, the existing metropolitan area carriers continue to use older, installed SONET (Synchronous Optical NETwork) architecture which, although it allows data streams of different formats to be combined onto a single high speed fiber optic synchronous data stream, cannot be scaled to meet future bandwidth requirements. Although customer demand for increased bandwidth has been growing at exponential rates, there is a mismatch between carrier long-haul backbones and metro area backbones on the one hand and local loop access on the other hand. Despite the aggressive deployment of fiber-optic networks nationwide, relatively little fiber has been deployed in the local access market or "last mile." Fiber deployment in Metro Area Networks ("MANs") has been primarily to carrier and service provider locations, or to a relatively small number of very large commercial office building sites. At the current time, it is estimated that as few as 10% of all commercial buildings in the United States are served with fiber-optic networks.

Currently, most local connectivity service providers are primarily providing SONET-based services and are investing little in the services required for expanded local connectivity—e.g., Ethernet and Wavelength services. In general, existing local service providers have not moved forward to upgrade local fiber infrastructure to support these latter services.

In order to provide compatibility and easy upgrading from existing services to new services, it is desirable to provide SONET, Ethernet and Wavelength services in the metropolitan and access segments of the communications infrastructure, making use of a common interface system and fiber optic cables. In this way, it is possible for customers to migrate smoothly and at an opportune time from the traditional SONET-based circuits to Ethernet circuits and, possibly, to transparent wavelengths. Such an evolutionary connectivity path enables customers to access the right amount of bandwidth at the right time.

SUMMARY OF THE INVENTION

In accordance with the present invention, a service network provides customers with a highly-available transparent Layer 2 network connection between their edge IP equipment and their subscribers' edge IP equipment.

Layer 2, known as the bridging or switching layer, allows edge IP equipment addressing and attachment. It forwards packets based on the unique Media Access Control ("MAC") address of each end station. Data packets consist of both infrastructure content, such as MAC addresses and other information, and end-user content. At Layer 2, generally no modification is required to packet infrastructure content when going between like Layer 1 interfaces, like Ethernet to Fast Ethernet. However, minor changes to infrastructure content—not end-user data content—may occur when bridging between unlike types such as FDDI and Ethernet. Additionally, the Ethernet service can inter-connect customers to create an "extended" LAN service.

Layer 3, known as the routing layer, provides logical partitioning of subnetworks, scalability, security, and Quality of Service ("QoS"). Therefore, it is desirable that the network remain transparent to Layer 3 protocols such as IP. This is accomplished by the combination of a particular network topology combined with failure detection/recovery mechanisms, as more fully described herein.

Embodiments of the present invention may include the following advantages: (1) in the BDN, a dedicated pair of diversely routed optical fibers for each customer; (2) in the core, a dual physical overlay ring core topology; (3) working and protection logical path connectivity; (4) no 802.1D Spanning Tree for recovery; (5) resilience to any single network failure in any device or link; (6) quick recovery times from failure relative to mechanisms based on Spanning Tree; and (7) a failure detection/recovery protocol that is not "active" on any devices other than the devices directly attached to the subscriber.

Further features and advantages of the invention will appear more clearly from a reading of the detailed description of the preferred embodiments of the invention, which are given below by way of example only, and with reference to the accompanying drawings, in which like references indicate similar elements, and in which:

DETAILED DESCRIPTION OF THE PREFERRED EMBODIMENT

A fiber optic transport network can generally be described in terms of three primary components: (i) a leased transport network (LTN), (ii) a leased distribution network (LDN); and (iii) a built distribution network (BDN), which may be a distribution network in accordance to the present invention (see FIGS. 1-6).

The LTN is the main transport layer of each metropolitan system. It typically consists of a high-bandwidth, flexible DWDM transport pipe used to connect customer locations (such as data centers, co-location hotels, and large customer POPs) to distribution networks.

The distribution networks may comprise both LDN and BDN designs, though either may be excluded. Although similar in general purpose, an LDN and a BDN may use differing architectural approaches to bring traffic to the LTN. While the LDN typically relies on TDM (and sometimes WDM) electronics to multiplex traffic onto limited quantities of fiber, the distribution network according to the present invention uses larger quantities of fiber, enabling a reduced reliance upon multiplexing electronics.

The following description will focus specifically on the architectural design and operation of a distribution network especially suitable for a BDN, though it may have other applications, particularly to an LDN. Detailed discussions of LTN and LDN designs may be found in other publicly available documents. The distribution network architecture maximizes the saturation of the potential subscriber base at minimal expense and is designed with the following criteria in mind.

Each subscriber should have access to a route-diverse connection to the LTN hub. In a preferred embodiment, these connections are capable of supporting:

(1) SONET services that require Line Overhead termination and Automatic Protection Switching (APS) controlled by the distribution network (DS-3, OC-3/OC-3c, OC-12/OC-12c, and OC-48/OC-48c).

(2) Data devices with SONET interfaces that require Line Overhead termination, but may lack APS functionality (DS-3, OC-3c, OC-12c, and OC-48c).

(3) Ethernet services (10, 100, and 1000 base).

(4) Wavelength services (1000-LX/LH/ZX, OC-48/OC-48c).

In a preferred embodiment, the distribution design is scalable and flexible enough to adapt to the eventual traffic needs of the network. Circuits from multiple subscribers should be reasonably segregated. Where feasible, the distribution architecture should ensure that work requested by one subscriber seldom impacts other subscribers.

Figure 1:
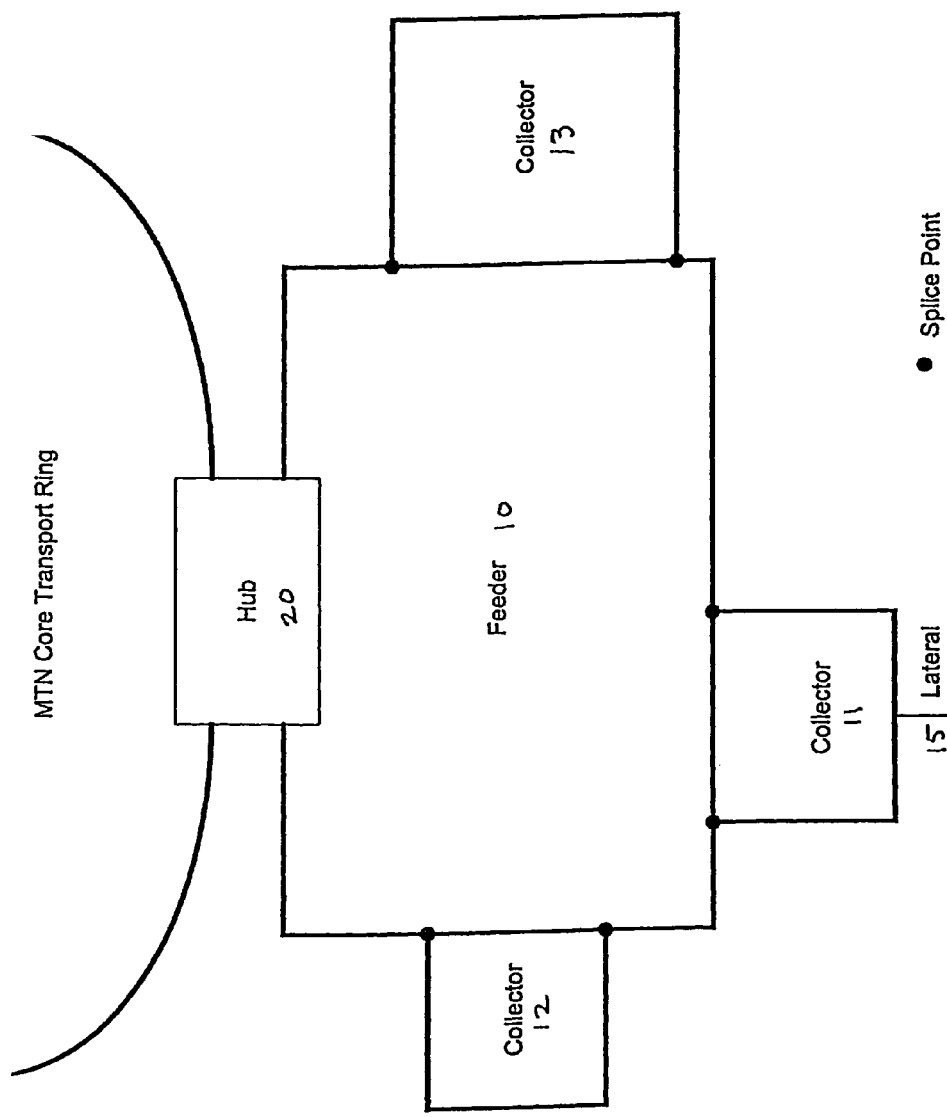
FIG. 1 is a schematic diagram of a local distribution portion of an overall fiber optic network, illustrating the relationship between multiple subscribers disposed on collection loops connected to a hub facility via a feeder loop.

Referring now to FIG. 1, the distribution network comprises a major feeder ring 10 with a series of smaller, subtending collector rings 11-13. In a common metropolitan-wide network design, collector rings are installed to follow city streets. Feeder ring 10 accesses at least one LTN Hub 20, where the distribution network fiber may be terminated to high-density fiber distribution panels (FDPs).

One particular feature of any local distribution architecture is the quantity of fiber run on the distribution network. Although fiber counts will vary based on the logistics of the distribution area, a typical feeder ring 10 will contain 432 fibers, and typical collectors 11-13 each will contain 144 fibers. Laterals (e.g., 15) extend from the collector rings 11-13 to subscriber buildings (e.g., 17), and will typically contain 48 fibers. As shown, each collector (11-13) is preferably deployed with two splice points to the feeder 10. A person of ordinary skill in the art will readily appreciate that fiber counts may be varied upwardly or downwardly without deviation from the present invention. The overall goal of the preferred embodiment is to provide, for each subscriber, optical service with at least one diversely-routed, dedicated fiber pair.

Select embodiments of the presently proposed distribution network architecture have the following advantages over conventional TDM and WDM distribution networks.

(i) Lower cost—At the present time, the major cost associated with any new fiber run is the cost of opening and closing the trench. Since this cost is substantially independent of the number of fibers being run, the comparison between a bulk-fiber distribution network and a TDM-based distribution network (similar to the LDN design), for example, becomes mainly a comparison between costs of fiber versus electronics. On relatively short fiber runs (like a distribution network), additional fiber is generally less expensive than TDM electronics. When the costs associated with space, power, operation, maintenance, and management of the TDM electronics is added, the cost advantages of a bulk-fiber approach increase dramatically.

(ii) Manageability—Connecting subscribers to a distribution network becomes a relatively simple task of splicing fibers between the subscriber building and the collector. This design eliminates an extra layer of TDM circuit provisioning and management. Requirements of TDM software upgrades and equipment failures are likewise reduced.

(iii) Scalability—Since each subscriber's optical service may be on a dedicated fiber pair, significant capacity exists at the outset and there is no concern regarding TDM circuit fill ratios or provisioning anomalies. This design also minimizes the need for TDM reconfigurations to support capacity expansions.

(iv) Circuit protection—Isolating each subscriber's optical service on a dedicated fiber pair reduces the possibility that work requested by one subscriber affects other subscribers. This represents a significant advantage in network accessibility when compared to designs that rely on multiple subscribers sharing a TDM resource.

Although a primary goal of the preferred embodiment of the BDN design is to reduce the use of electronics at each subscriber site, electronic components will still be required for subscribers who elect to use electrical circuits (e.g., DS-3, 10-base, and 100-base). Electrical circuits must still be converted into optical circuits for transport around the BDN. Due to the distances within the BDN, single-mode fiber connectivity is the preferred embodiment to support the connection between the subscriber site and the hub location. Therefore, additional electronics may be required for subscribers who desire optical circuits when these subscribers occupy locations or operate equipment with an embedded base of Multi-Mode Fiber ("MMF").

Figure 2:
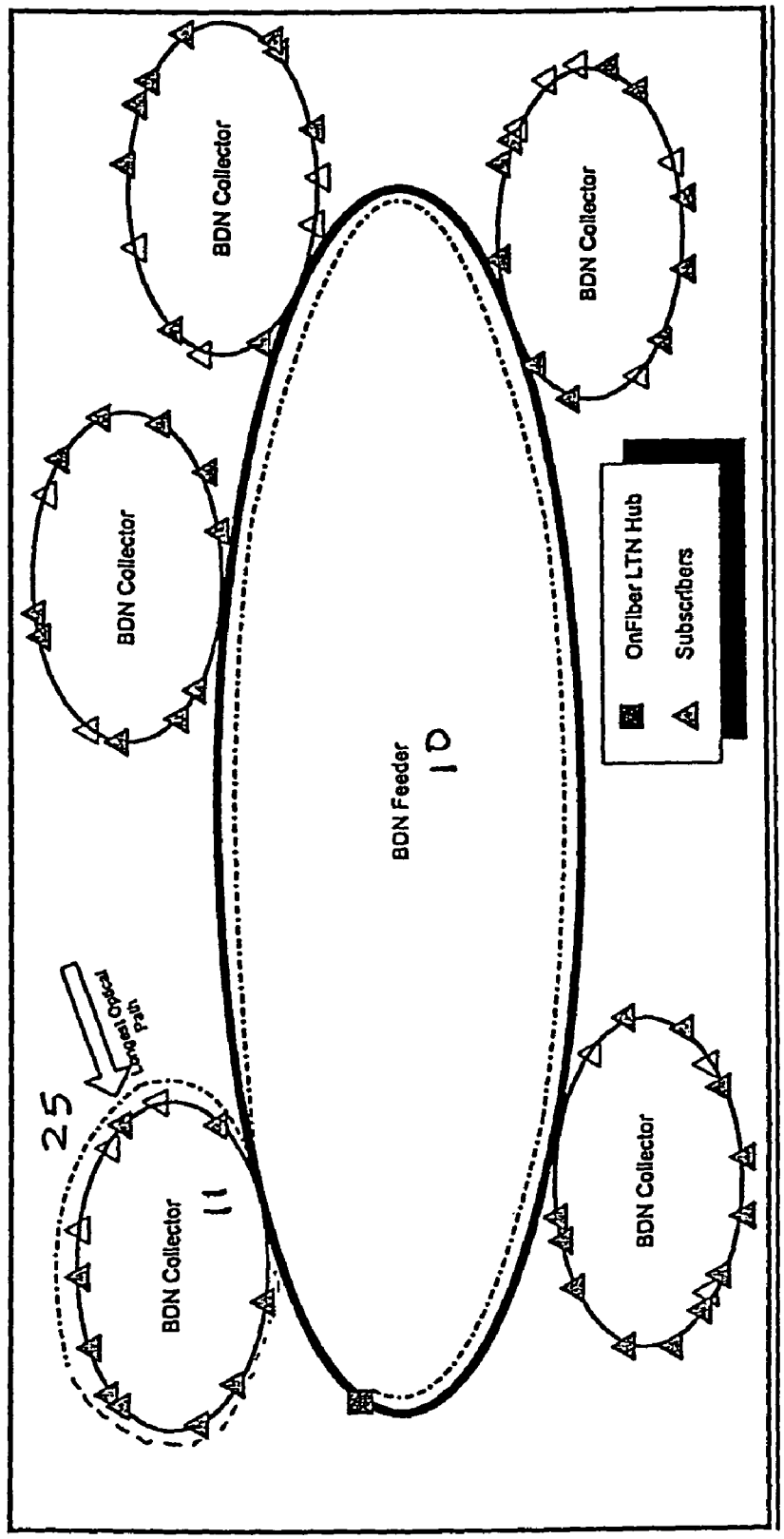
FIG. 2 is a schematic diagram illustrating a typical longest path around an access distribution network.

FIG. 2 illustrates the longest optical path 25 around the distribution network. This calculation is the sum of the length of the longest collector (shown as 11) and the length of the feeder 20. The longest optical path 25 is a significant limitation to be considered in the design of the distribution network, as discussed in greater detail below.

The physical connections of circuits and facilities on the distribution network are described in greater detail below. Exemplary subscriber connections can be found by reference to FIGS. 3-7, discussed below.

LTN Hubs

At LTN Hub 20 locations, distribution network fiber can be terminated to high-density Fiber Distribution Panels (FDPs). From these locations, subscriber circuits may be cross-connected to ADM equipment, Ethernet switches, or directly to an LTN DWDM system. The ADMs and Ethernet switches aggregate circuits with common destinations (e.g., customer locations) and transfer them to the LTN for transport around the metropolitan network.

Single-Tenant Subscriber Facilities

In a single-tenant subscriber facility, a lateral fiber offshoot can be deployed to connect the appropriate feeder 10 fibers to a low-density FDP on the subscriber's premises. For optical services, this FDP will serve as a demarcation point between the distribution network and the subscriber equipment. For electrical services, an additional component can be placed at the subscriber's site. This component typically will be a media converter capable of converting an electrical signal into a higher-rate optical signal for transport over the distribution network. This converter equipment can usually be powered by the subscriber's AC power facilities, although a small UPS (Uninterruptible Power Supply) device may be required in cases where brownout protection is lacking from the subscriber's AC feed.

Multiple-Tenant Subscriber Facilities

Access to multiple-tenant facilities may be similarly designed. A primary difference will often be the equipment location. Any necessary auxiliary electrical equipment (FDP, DSX, patch panel, SONET TDM, Ethernet switch, media converter) may be located either within a Minimum Point of Entry (MPOE) facility inside the building or within the subscriber's location. When it is located within the MPOE, such equipment preferably should be within a protected enclosure (e.g., a cage or locked cabinet). DC power (e.g., −48V regulated with battery reserve) may be provided as an option in larger MPOE facilities. However, AC power with a UPS reserve is also feasible.

Fiber Plant

At present, the majority of optical circuits transported over the distribution network preferably will utilize 1310 nm lasers and therefore, Non-Dispersion Shifted Fiber (NDSF) is the preferred fiber for such distribution network deployment. Non-Zero Dispersion Shifted Fibers (NZ-DSF) and Multi-Mode Fiber (MMF), though not presently preferred, may be used in alternative embodiments.

Subscriber Laterals

Normally, a 48-count fiber bundle can be run in a single 1.5" conduit between the collectors 11-13 and subscriber facilities. As a result, most laterals will be single-threaded. A person of ordinary skill in the art will readily appreciate that dual-threaded laterals, and laterals of different fiber counts, may also be run. Depending on system requirements, fusion or mechanical splices may be utilized. Mechanical splices are preferably used between the lateral and the Collector fibers. High quality mechanical splices can be obtained that provide typical insertion loss below 0.10 dB. Fusion splices are preferably utilized between the lateral and the FDP within the subscriber site. Fusion splices can routinely introduce insertion losses of less than 0.05 dB.

Collector Loops

In a preferred embodiment, a collector loop will consist of a 144-count fiber bundle run in a single 4" conduit. The 4" collector can compartmentalized, such as with individual 1.0" conduits or "MaxCell"® fabric inner ducts. In cases where a single Collector runs in the same trench as a Feeder loop, it is expected that the Collector fibers will utilize one of the Feeder's expansion conduits instead of the 4" conduit discussed above. Both ends of a Collector loop will not necessarily intersect the Feeder at the same physical location. Fusion splices are preferably utilized between the Collector and Feeder loops.

In order to minimize the frequency of adding new splices between Collector and Feeder loops, a reasonable quantity of splices will be generated at the outset to cover the near-term growth of traffic on the distribution network.

Feeder Loops

In most cases, feeder loop 10 will consist of a 288 or 432-count fiber bundle run in a single 1.5" conduit. A person of ordinary skill in the art will readily appreciate that fiber bundles of greater or lesser count may be used as appropriate. Additional conduits preferably will be included along the Feeder path to accommodate future growth. In cases where a Collector loop runs parallel to a Feeder loop, it is expected that the Collector will utilize one of the Feeder's surplus 1.5" conduits instead of the Collector's usual 4" conduit. Fusion splices should be utilized for all connections to and from Feeder loops. All fusion splices should introduce an insertion loss of no greater than 0.05 dB.

Feeder 10 fibers can be spliced to pigtails and terminated in the Hub 20 location on initial installation. This reduces the frequency of adding new splices on the feeder loop 10 and reduces the interval required for service activation.

An Alternative Embodiment—Additional Equipment

In this embodiment, in addition to the conventional feeder/collector architecture, additional electronic equipment can be deployed at either the subscriber facility or the hub 20 to provide intermediate-reach optics on both sides of the transmission link.

For example, with respect to SONET equipment, a series of ADMs will already exist at the hub locations to aggregate subscriber traffic, and IR-1 optics can be supported on each optical interface of the ADMs. Wavelength services pose a more complex problem. Since these services enter the DWDM directly at the Hub, they are limited by the current SR client-side interface on the DWDM equipment. Since it is unlikely that any wavelength service below an OC-48 or Gigabit Ethernet data rate will be used in this context (as this would require dedicating a DWDM wavelength to an OC-3 or OC-12 rate circuit), this would only pose a problem for OC-48 or Gigabit Ethernet wavelength services.

In the case of Gigabit Ethernet services, upgrading a subscriber to a GBIC equivalent to the Finisar 1319-5A-30 would improve the optical reach to roughly 16.3 miles. This is less than one mile shorter than the range of a bi-directional IR-1 link. The OC-48/OC-48c case is more difficult. To support this service, a subscriber positioned near a Hub either should use LR-1 optics (assuming they are available on the subscriber equipment), or place an OC-48 regenerator at the Hub location.

Second Alternative Embodiment—Nested Feeders

Figure 3:
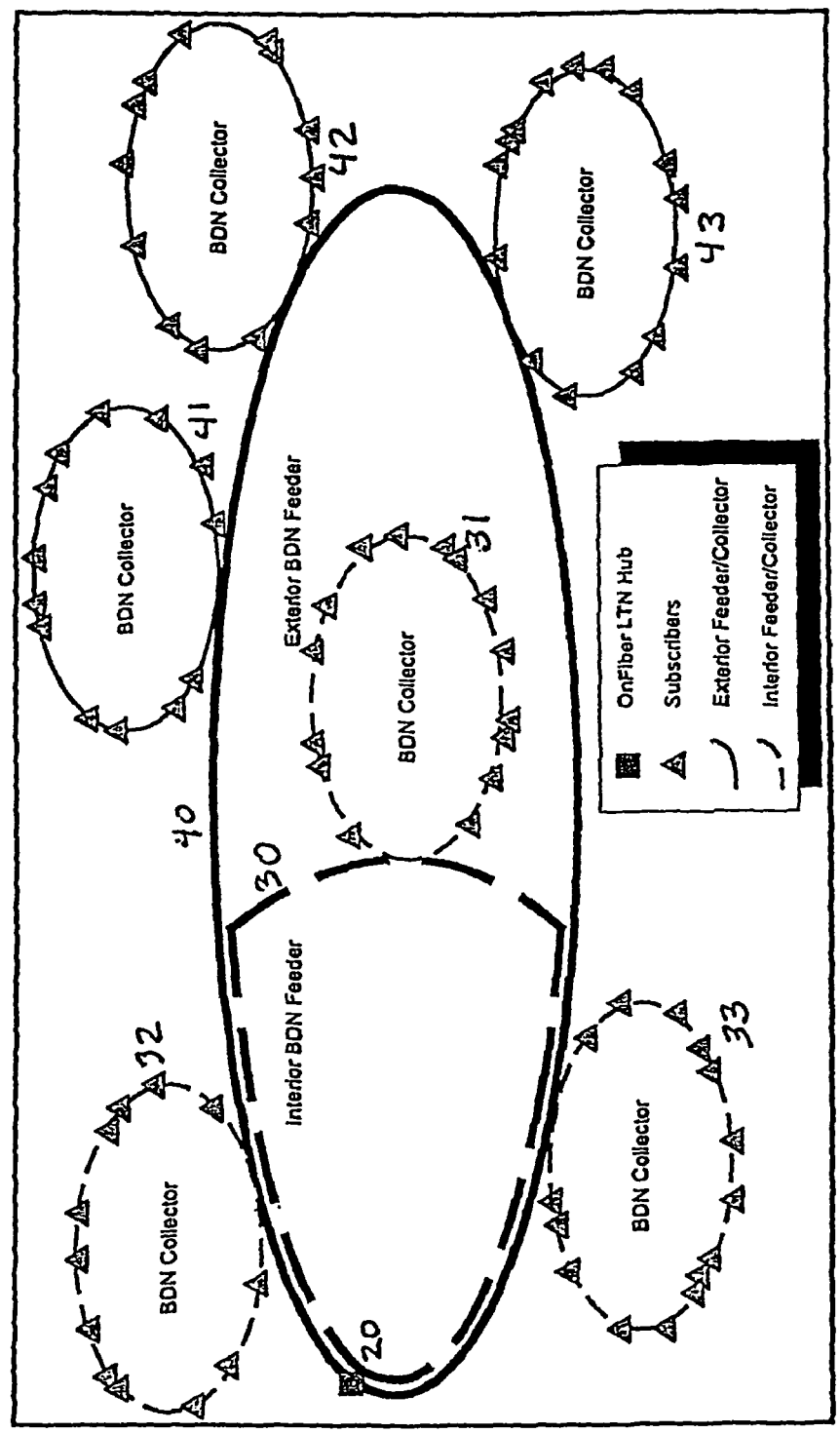
FIG. 3 is a schematic diagram illustrating an alternative design with nested feeders.

In this scenario, the distribution network provider deploys a pair of nested Feeder rings 30 in each distribution network. The collectors 31, 32 and 33 closest to the hub 20 are placed on the nested feeder 30, while the collectors 40, 41 and 42 located farther out are placed on the longer feeder 40. FIG. 3 displays a generic example of this configuration. With the FIG. 3 type of configuration, the longer feeder 40 can remain longer (e.g., more than 7 miles in circumference) without stranding capacity because the collectors closest to the LTN hub 20 have a shorter path available to them.

Although the additional cross-section of fiber that completes the interior Feeder may increase the cost of the distribution network, it may also provide the opportunity to place one or more additional Collectors that would have otherwise been difficult to attach to the single Feeder design.

Decision Rule for Distribution Network Variants

In significant part, the distribution network design can be directed based on the guidelines below. In each case, the longest subscriber path is calculated as follows. Each Collector has a corresponding longest circuit path. The longest circuit path can be defined as the sum of the circumference of the Collector and the longest route around the Feeder between the Collector and the Hub. This value represents the maximum distance that a subscriber circuit on that Collector can possibly travel en route to the Hub. This value is unique to each Collector on the distribution network. After calculating this value for each collector on the distribution network, the largest of these values would represent the longest subscriber path on that distribution network.

Longest Subscriber Path is less than 9 Miles

Any distribution network that meets this requirement can be designed using the conventional single Feeder, multiple Collector architecture.

Longest Subscriber Path is between 9 and 16 Miles

Any distribution network that falls in this category will encounter complications based on the optical link budget. With this in mind, the distribution network should be examined in detail to determine whether a nested feeder approach is appropriate. In most cases, the nested feeder architecture is desirable when a significant portion of potential subscribers must traverse more than nine miles of fiber (longest route around the Feeder) to access the Hub or the additional cross section of fiber added to create an Interior Feeder allows the addition of a new, desirable Collector that would have otherwise been inaccessible.

Longest Subscriber Path is greater than 16 Miles

Any distribution network in this classification gives rise to design problems as one begins to exceed the limits of both Gigabit Ethernet and SONET IR-1 optics. In this case, either the distribution network may be configured to utilize the nested feeder architecture, or it can be redesigned to shorten the longest subscriber path.

Synchronization

Subscribers purchasing SONET services can synchronize their equipment with the Network by line-timing from the optics of the ADM at the Hub. Similarly, subscribers purchasing Ethernet services can line-time from the optics of the system Ethernet Switch at the Hub facility. However, this option is not available for wavelength services, as these circuits bypass any equipment that can connect to a BITS clock. Subscribers who desire wavelength services must therefore either provide their own clock source or line-time from the customer equipment that they logically attach to on the far end of the distribution network. Should either of these options be unavailable for a given subscriber circuit, there is still a likely option available to provide error-free service. Depending on the age of the equipment, Telcordia compliant devices should contain an internal SONET Minimum Clock (SMC) source or Stratum 3 clock source. Either should provide adequate synchronization for SONET signals. Any equipment free-running on a Stratum 3 or SMC source should operate error-free under normal conditions. The major perceptible difference will be an increase in the frequency of pointer justification events between interconnected devices.

Depending on the situation, SONET equipment installed at a subscriber site may be owned and maintained either by the distribution network operator or by the individual subscriber. Ethernet equipment installed at a subscriber site will generally be owned and maintained by the subscriber.

All distribution network electronics installed at subscriber locations that are owned and maintained by the distribution network operator should be remotely manageable, and should be capable of forwarding alarm messages to the system NOC. SONET equipment will commonly utilize the SONET Section Data Communications Channel (SDCC) to communicate with the ADM equipment installed at the Hub.

The Ethernet Services Network

Resiliency

It is desirable that a network of the type described herein be substantially always available. In addition, a desirable network architecture will provide fast recovery from failure to meet uptime objectives. Taking as an example Ethernet as the local loop technology, it is an objective that Ethernet services be highly available. This objective makes the elimination of any Spanning Tree Protocol ("STP") from the architecture desirable. In a preferred embodiment, STP is not used because otherwise, network recovery times may be of the order of minutes per failure.

The network elements which provide redundancy need not be co-located with the primary network elements. This design technique reduces the probability that problems with the physical environment will interrupt service. Problems with software bugs or upgrades or configuration errors or changes can often be dealt with separately in the primary and secondary forwarding paths without completely interrupting service. Therefore, network-level redundancy can also reduce the impact of non-hardware failure mechanisms. With the redundancy provided by the network, each network device no longer needs to be configured for the ultimate in standalone fault tolerance. Redundant networks can be configured to fail-over automatically from primary to secondary facilities without operator intervention. The duration of service interruption is equal to the time it takes for fail-over to occur. Fail-over times as low as a few seconds are possible in this manner.

Dual Physical Overlay Ring Core Topology

Figure 4:
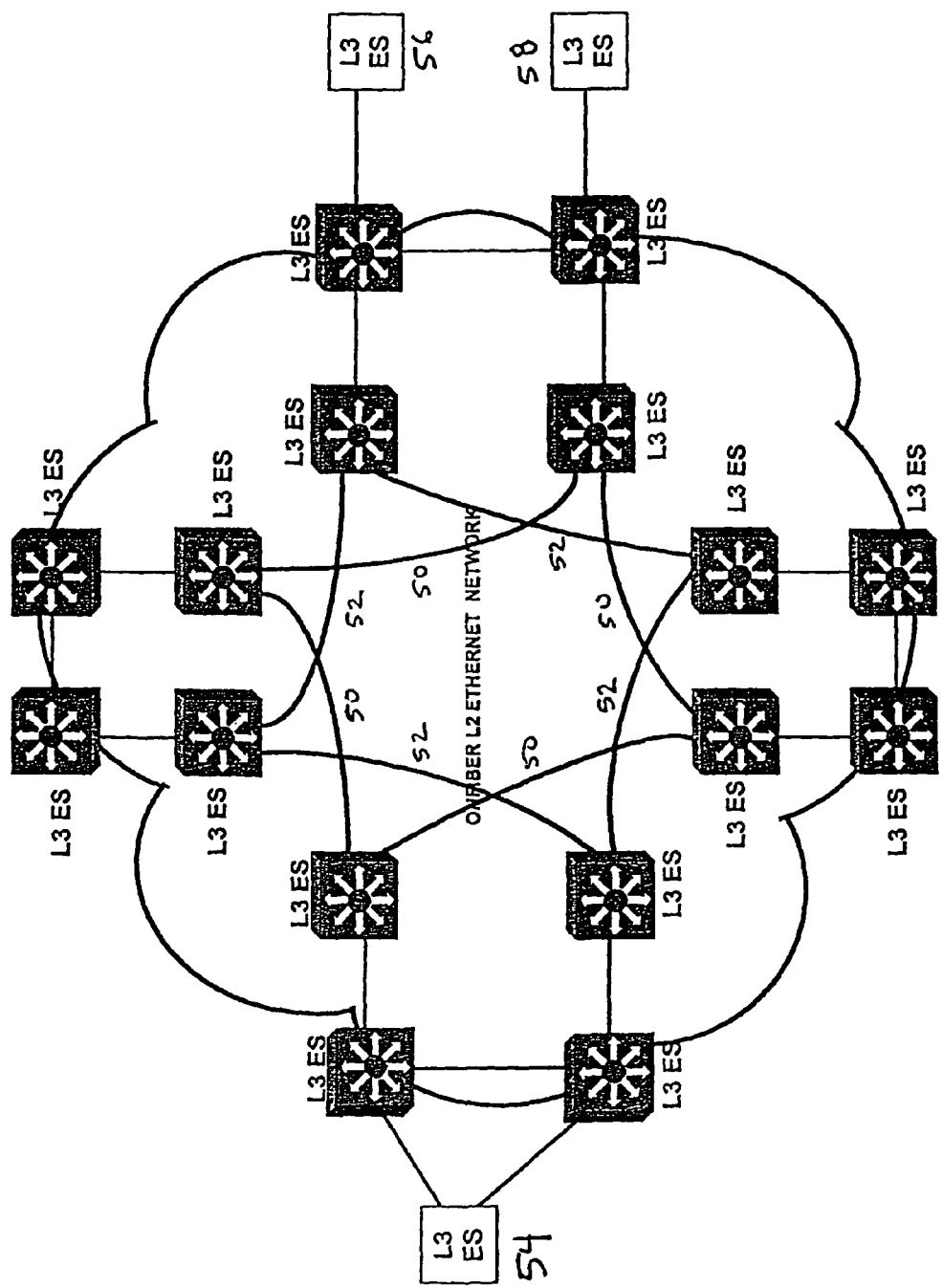
FIG. 4 is a schematic diagram of a dual overlay ring topology within the core.
Figure 5:
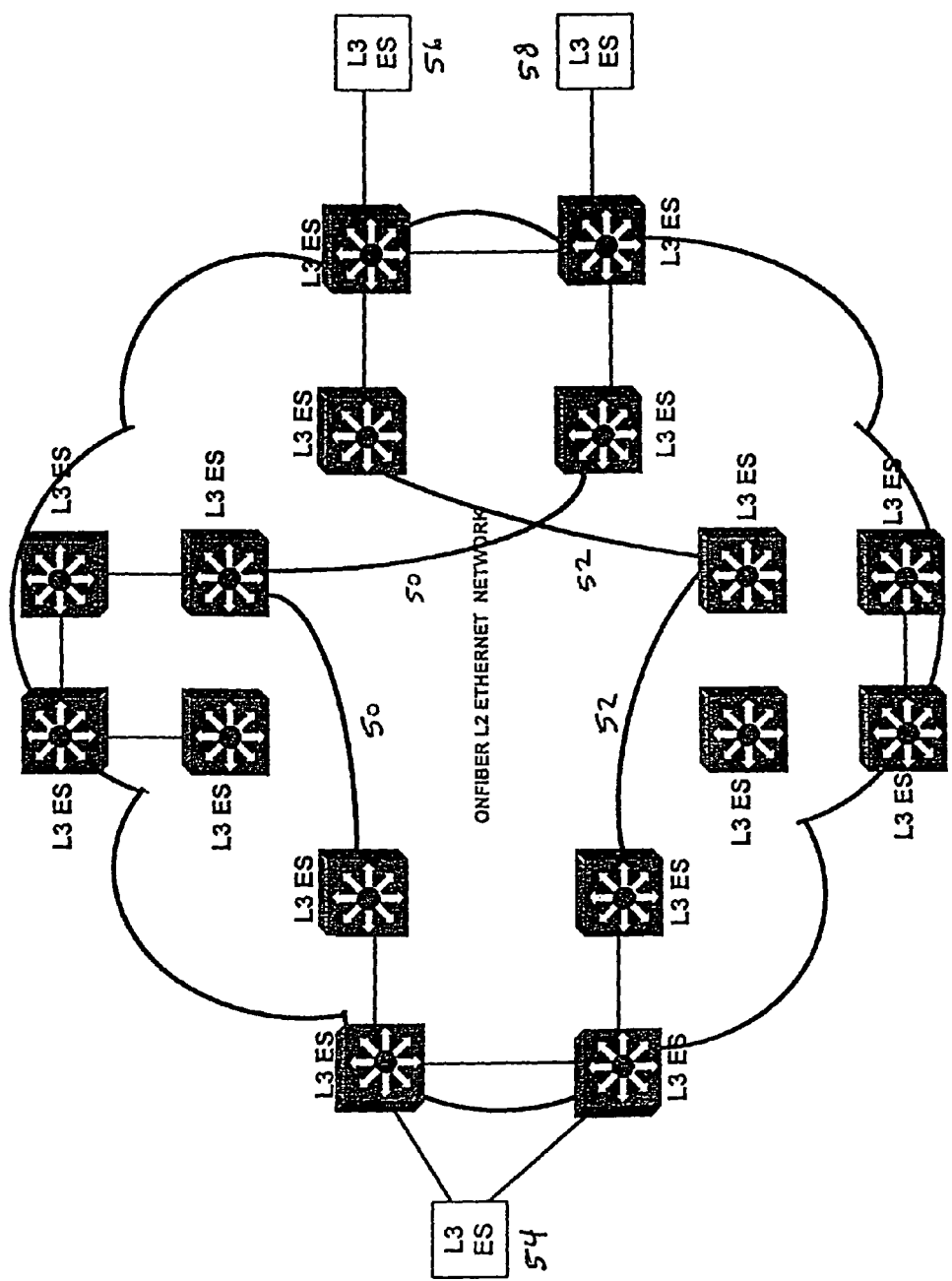
FIG. 5 is a schematic diagram of a working path and a protection path across the core connecting a subscriber's Layer 3 switch to its carrier/ISP.

The local services network (e.g., Ethernet) according to the preferred embodiment of the present invention comprises a dual overlay ring topology within the core. This topology is shown in FIG. 4. As can be seen, the dual overlay ring topology is a physical topology in which two complete physical paths are disposed to ensure that two data channels are available during normal periods of use so that at least one is available to communicate information in the event the other becomes unavailable.

This physical topology allows the creation of a working path 50 and a protection path 52 across the network connecting each subscriber (L3 Switch 54) to their carrier/ISP (L3 Switches 56, 58). The working path 50 can be provisioned on one ring while the protection path 52 can be provisioned on the other ring shown, creating the logical connectivity topology shown in FIG. 5.

Logical connectivity may be accomplished in many ways, such as by using Ethernet Virtual LAN (VLAN) tagging, as defined in the IEEE 802.1Q standard. A VLAN can be roughly equated to a broadcast domain. More specifically, VLANs can be seen as analogous to a group of end-stations, perhaps on multiple physical LAN segments, which are not constrained by their physical location and can communicate as if they were on a common LAN. The 802.1Q header adds two octets to the standard Ethernet frame. By configuring ports on the Ethernet switches (e.g., 54) to be part of the specific customer's VLAN, the logical connectivity paths are created through the network. This process is somewhat analogous to creating a Permanent Virtual Circuit ("PVC") in the Frame Relay or ATM environment.

Extreme Network's Standby Router Protocol ("ESRP") may be used to detect and recover from failures that occur within the Ethernet Network. Additional protocols may be implemented to support detection and recovery of failures that occur at the Carrier/ISP connection. Some of these protocols are Hot Standby Router Protocol ("HSRP") and Virtual Router Redundancy Protocol ("VRRP"). Note that standard Layer 2 protection protocols such as 802.1D Spanning Tree are not required in some embodiments of the present invention.

Overview of ESRP

ESRP is a feature of the Extreme OS (operating system) that allows multiple switches to provide redundant services to users. In addition to providing Layer 3 routing redundancy for IP, ESRP also provides Layer 2 redundancy. The Layer 2 redundancy features of ESRP offer fast failure recovery and provide for a dual-homed system design generally independent of end-user attached equipment.

ESRP is configured on a per-VLAN basis on each switch. This system utilizes ESRP in a two switch configuration, one master and one standby. The switches exchange keep-alive packets for each VLAN independently. Only one switch can actively provide Layer 2 switching for each VLAN. The switch performing the forwarding for a particular VLAN is considered the "master" for that VLAN. The other participating switch for the VLAN is in 'standby' mode.

For a VLAN with ESRP enabled, each participating switch uses the same MAC address and must be configured with the same IP address. It is possible for one switch to be master for one or more VLANs while being in standby for others, thus allowing the load to be split across participating switches.

To have two or more switches participate in ESRP, the following must be true. For each VLAN to be made redundant, the switches must have the ability to exchange packets on the same Layer 2 broadcast domain for that VLAN. Multiple paths of exchange can be used, and typically exist in most network system designs that take advantage of ESRP. In order for a VLAN to be recognized as participating in ESRP, the assigned IP address for the separate switches must be identical. ESRP must be enabled on the desired VLANs for each switch. Extreme Discovery Protocol (EDP) must be enabled on the ports that are members of the ESRP VLANs.

Master Switch Behavior

If a switch is master, it actively provides Layer 2 switching between all the ports of that VLAN. Additionally, the switch exchanges ESRP packets with other switches that are in standby mode.

Standby Switch Behavior

If a switch is in standby mode, it exchanges ESRP packets with other switches on that same VLAN. When a switch is in standby, it does not perform Layer 2 switching services for the VLAN. From a Layer 2 switching perspective, no forwarding occurs between the member ports of the VLAN. This prevents loops and maintains redundancy.

ESRP Tracking

ESRP can be configured to track connectivity to one or more specified VLANs as criteria for fail-over. The switch that has the greatest number of active ports for a particular VLAN takes highest precedence and will become master. If at any time the number of active ports for a particular VLAN on the master switch becomes less than the standby switch, the master switch automatically relinquishes master status and remains in standby mode.

Additionally, ESRP can be configured to track connectivity using a simple ping to any outside responder (ping tracking). The responder may represent the default route of the switch, or any device meaningful to network connectivity of the master ESRP switch. It should be noted that the responder must reside on a different VLAN than ESRP. The switch automatically relinquishes master status and remains in standby mode if a ping keep-alive fails three consecutive times.

Figure 6:
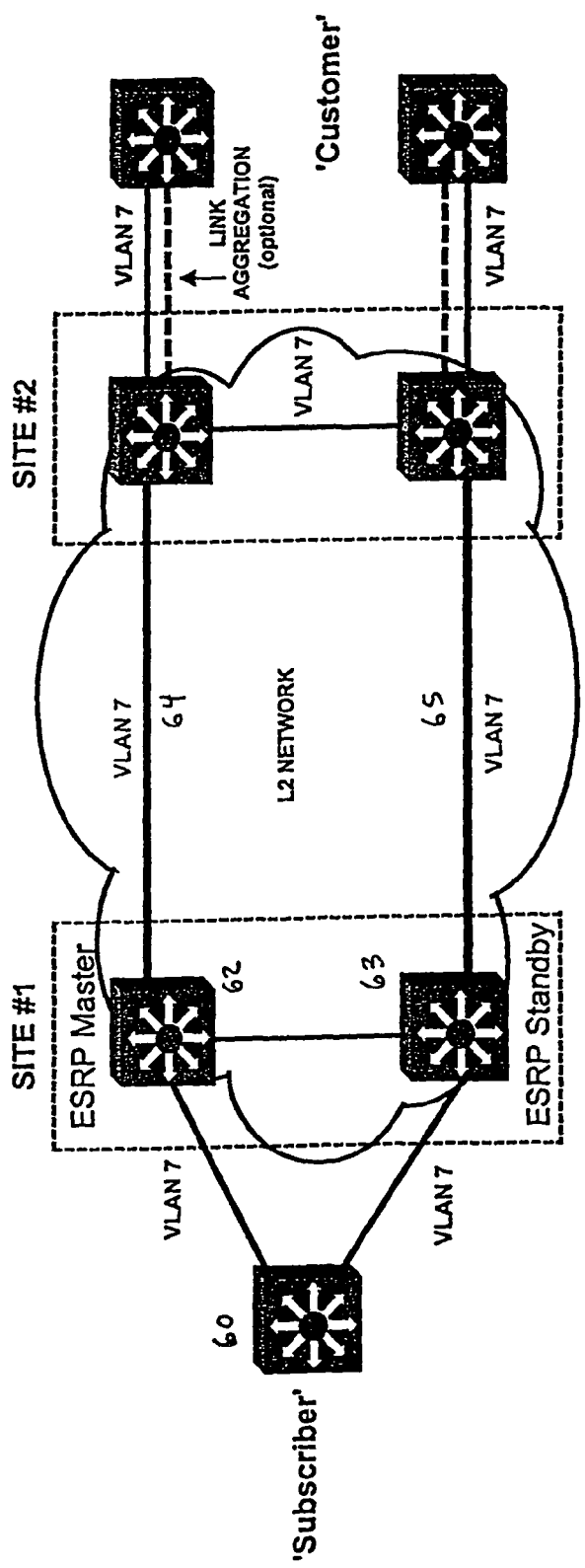
FIG. 6 is a simplified logical diagram of the end-to-end Ethernet service indicating where ESRP is utilized.

A simplified drawing of the logical topology is shown in FIG. 6, indicating where ESRP is utilized in the present distribution network design. FIG. 6 depicts ESRP enabled in the switches (62, 63) directly attached to the subscriber 60. Port track is used to detect local failure of a link directly connected to these switches while ping track is used to detect core network failures. If a failure is detected anywhere along the active path 64, ESRP will failover to allow traffic to flow on the standby path 65. As shown, ESRP port count can be used to protect dual customer connections to the network. ESRP ping tracking is used to protect the core VLAN. In the exemplary embodiment shown, VRRP or HSRP protects the Carrier/ISP L3 switch.

ESRP Enhancements

A preferred embodiment of the network includes network enhancements, including Extreme Network's ESRP, to support rapid failover of subscriber equipment when a network or core failure occurs. In the context of ESRP, this is referred to as "ESRP Failover Link Transition Enhancement." This enhancement refers to the ability of a "Master" ESRP switch, when transitioning to standby state to "bounce" or restart auto-negotiation on a set of physical ports. This enhancement will cause an end device to flush its Layer 2 forwarding database and cause it to re-broadcast immediately for a new path through the network. This provides the end station the ability to switch from the primary to the secondary path in a very short time.

This enhancement relates to the ability of a "Master" ESRP switch, when transitioning to a standby state to "bounce" or restart auto-negotiation on a set of physical ports. This is useful in this architecture to inform an end-user Layer 2 device of a failure farther within the network that does not directly impact the end-user Layer 2 device. As background: Typical Layer 3 switches use the Address Resolution Protocol (ARP) to populate their forwarding databases. This forwarding database determines which port packets are sent out on based on destination MAC address. Once this information is learned through the ARP process, typical Layer 2 devices will not modify this forwarding information unless one of two events occur. First, a Loss of Signal (LOS) occurs on the port or 2) the ARP max age timer expires. Typically, the ARP max age value is set to 5 minutes. When this timer expires, the Layer 2 device will re-ARP to update its forwarding database information. Therefore, if a failure occurs within the core of the network that does not cause a LOS on the end-user device, that device will continue to forward packets into the network even though they cannot reach their ultimate destination until the ARP max age timer expires. This is known as a black hole situation. The enhancement proposed here prevents a black hole situation, by notifying the end device of the core failure by "bouncing" the port to force the equipment to re-ARP to update its forwarding database information immediately.

Although certain preferred embodiments of the present invention have been described above by way of example, it will be understood that modifications may be made to the disclosed embodiments without departing from the scope of the invention, which is defined by the appended claims. The benefits, advantages, solutions to problems, and any element (s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Glossary of Terms

ADM—Add/Drop Multiplexer. A SONET component capable of inserting and removing traffic to/from the SONET line payload. ADMs also commonly perform other functions, such as generating/processing APS commands and synchronizing the transport optics to an external clock source.

APS—Automatic Protection Switching. A SONET fault recovery protocol standardized by Telcordia. APS will generally provide fault recovery in less than 50 ms.

BDN—Built Distribution Network. A portion of a network dedicated to the aggregation of multiple subscribers. A BDN typically utilizes fiber to provide dedicated fiber links between individual subscribers and a Hub facility.

BITS—Building Integrated Timing Source. A highly accurate and precise clock source used to synchronize multiple nodes on a SONET transport system.

Chromatic Dispersion—A linear effect that causes pulse broadening or compression within an optical transmission system. Chromatic Dispersion is occurs because different wavelengths of light travel at different velocities through the transmission media.

Collector Loop—A fiber loop (typically 144 ct) used to connect multiple subscribers to the larger Feeder loop on a BDN.

Customer—A business entity (such as an ISP or LEC) that provides telecommunications service within a Metropolitan area. The BDN operator typically will serve as an intermediate transport mechanism to connect subscribers to various customers.

DMD—Differential Mode Delay. A linear effect that degrades the quality of laser transmissions across MMF. A single laser transmission can inadvertently become subdivided upon ingress to MMF. These identical signals traverse unique transmission paths within the large core of MMF and leave the fiber offset in time.

DS3—Digital Signal 3. A digital signal rate of approximately 44.736 Mb/s corresponding to the North American T3 designator. A plesiochronous transport protocol equivalent to 672 voice lines at 64 kb/s each.

DWDM—Dense Wavelength Division Multiplexing. A method of allowing multiple transmission signals to be transmitted simultaneously over a single fiber by giving each a unique frequency range (or wavelength) within the transmission spectrum. DWDM wavelengths within the C-Band are standardized by the ITU-T.

Ethernet—A standardized (IEEE 802.3) packet-based data transport protocol developed by Xerox Corporation.

Ethernet Switch—A device used to route data packets to their proper destination in an Ethernet-based transport network.

FDP—Fiber Distribution Panel. An enclosure built to organize, manage, and protect physical cross-connections between multiple fiber-optic cables.

Feeder Loop—A fiber loop (typically 432 ct) used to connect multiple collector loops to a Hub facility on a BDN.

Fusion Splice—The process of joining of two discrete fiber-optic cables via localized heating of the fiber ends. Fusion splices are typically characterized as permanent in nature and exhibit relatively minor loss (<0.05 dB) at the fusion point.

Hub Facility—A facility used to connect a distribution network (BDN or LDN) to a transport network (LTN) within a Metropolitan area.

IR-1—A specification for transmission lasers and receiver photodiodes standardized by Telcordia. IR-1 optics typically provide a 13.0 dB link budget and are optimized for NDSF.

ITU-T—International Telecommunications Union—Telecommunications Standardizations Sector.

Lateral—A fiber spur containing multiple fibers (e.g., 48 ct) used to connect a Collector loop to a subscriber site.

LDN—Leased Distribution Network. A portion of a network dedicated to the aggregation of multiple subscribers. An LDN typically utilizes fiber to provide fiber links between individual subscribers and a Hub facility.

LR-1—A specification for transmission lasers and receiver photodiodes standardized by Telcordia. LR-1 optics typically provide a 25 dB link budget and are optimized for NDSF.

LTN—Leased Transport Network. A portion of a network dedicated to connecting various Customer sites to Hub facilities. An LTN will typically utilize TDM and DWDM equipment over a small quantity of leased fiber.

MCP—Modal Conditioning Patch cord. A hybrid fiber-optic cable used to overcome DMD problems by allowing a laser to mimic the overfilled launch characteristics of an LED.

Mechanical Splice—The process of joining of two discrete fiber-optic cables by aligning them within a mechanical enclosure or adhesive media. Mechanical splices typically utilize an index-matching gel to reduce reflection at the splice point. Expect a moderate power loss (0.10 to 0.20 dB) at the splice point.

Media Converter—A generic classification of devices used to alter protocols and/or media of a transmitted signal.

MMF—Multi-Mode Fiber. A fiber-optic cable with a relatively large (50 to 62 µm) transmission core that allows signals to traverse multiple, discrete transmission paths (modes) within the cable. MMF is typically utilized with LED-based optical transmission systems.

Modal Distortion—A linear effect that causes pulse broadening of transmission signals over MMF. Rays taking more direct paths (fewer reflections in the core) through the MMF core traverse the fiber more quickly than rays taking less direct paths. Modal distortion limits the bandwidth and distance of transmission links over MMF.

MPOE—Minimum Point of Entry. A common space within a multi-tenant building used to interconnect multiple tenants with common external telecommunications facilities.

NDSF—Non Dispersion-Shifted Fiber. Single-mode optical fiber with a nominal zero-dispersion wavelength within the conventional 1310 nm transmission window.

NZ-DSF—Non-Zero Dispersion-Shifted Fiber. Single-mode optical fiber with a nominal zero-dispersion wavelength shifted to reduce chromatic dispersion within the 1530 nm to 1560 nm transmission window.

OC-3—Optical Carrier 3. The optical equivalent to an STS-3, with a digital signal rate of approximately 155.52 Mb/s. A synchronous transport protocol equivalent to 2016 voice lines at 64 kb/s each. Protocol is specified by Telcordia standards.

OC-3c—Optical Carrier 3, Concatenated. A non-channelized variant of the OC-3, primarily utilized for data transmissions over SONET. Protocol is specified by Telcordia standards.

OC-12—Optical Carrier 12. The optical equivalent to an STS-12, with a digital signal rate of approximately 622.08 Mb/s. A synchronous transport protocol equivalent to 8064 voice lines at 64 kb/s each. Protocol is specified by Telcordia standards.

OC-12c—Optical Carrier 12, Concatenated. A non-channelized variant of the OC-12, primarily utilized for data transmissions over SONET. Protocol is specified by Telcordia standards.

OC48—Optical Carrier 48. The optical equivalent to an STS-48, with a digital signal rate of approximately 2.488 Gb/s. A synchronous transport protocol equivalent to 32256 voice lines at 64 kb/s each. Protocol is specified by Telcordia standards.

OC48c—Optical Carrier 48, Concatenated. A non-channelized variant of the OC-48, primarily utilized for data transmissions over SONET. Protocol is specified by Telcordia standards.

Plesiochronous—The relationship between two transmission devices, where each is timed from similar, yet diverse clock sources. A slight difference in either frequency or phase must exist between the diverse clocks.

POP—Point of Presence. The physical facility in which interexchange carriers and local exchange carriers provide access services.

SMF—Single Mode Fiber. A type of optical fiber in which only a single transport path (mode) is available through the core at a given wavelength.

SONET—Synchronous Optical NETwork. A circuit-based transmission/restoration protocol defined by Telcordia standards. Use of the SONET TDM protocol is primarily limited to North America.

Splice Box—An enclosure built to organize, manage, and protect physical splices between multiple fiber-optic cables.

SR—A specification for transmission lasers and receiver photodiodes standardized by Telcordia. SR optics typically provide an 8 dB link budget and are optimized for NDSF.

Subscriber—An end-user (or desired end-user) of a Customer's telecommunications service. A BDN operator typically will serve as an intermediate transport mechanism between subscribers and customers.

Synchronous—The relationship between two transmission devices, where both are timed from identical clock sources. The clocks must be identical in frequency and phase.

TDM—Time-Division Multiplexing. Combining multiple transmission signals into a common, higher-frequency bitstream.

WDM—Wavelength-Division Multiplexing. A method of allowing multiple transmission signals to be transmitted simultaneously over a single fiber by giving each a unique frequency range (or wavelength) within the transmission spectrum.

What is claimed is:

1. A core service network comprising, at least one fiber optic dual overlay ring, wherein each of the at least one fiber optic dual overlay ring comprises, a plurality of complete and distinct physical paths between an Internet service provider ("ISP") and a subscriber party; wherein, the at least one fiber optic dual overlay ring supports synchronous optical network ("SONET") services, wavelength services, and Ethernet services between the ISP and the subscriber party over fiber optic cables;

a first of the plurality of complete and distinct physical paths comprises a plurality of master switches not used by a second of the plurality of complete and distinct physical paths;

the second of the plurality of complete and distinct physical paths comprises a plurality of standby switches not used by the first of the plurality of complete and distinct physical paths;

the first of the plurality of complete physical paths is allocated as a primary virtual line;

the second of the plurality of complete physical paths is allocated as a secondary virtual line; and at least one of the plurality of master switches is configured to transition to standby state in the event of a network or core failure, whereby the transitioning master switch restarts auto-negotiation on a set of physical ports when transitioning.

2. The core service network of claim 1, wherein said primary virtual line is configured to serve as a data channel.

3. The core service network of claim 2, wherein said secondary virtual line is configured to serve as a back-up channel to said primary virtual line.

4. The core service network of claim 3, wherein a logical connectivity between said ISP and said subscriber party is generated by using Ethernet Virtual LAN tagging.

5. The core service network of claim 4, said Ethernet Virtual LAN tagging comports with IEEE 802.1 Q.

6. The core service network of claim 3, further comprising applying a protocol for the detection of failures at a connection with said ISP.

7. The core service network of claim 6, further comprising applying a protocol for recovery of said connection with said ISP.

8. The core service network of claim 3 wherein, each of the first and the second of the plurality of complete and distinct physical paths comprise at least two paths.

9. The core service network of claim 8 wherein the at least two paths each use at least one distinct switch unused by any other of the plurality of complete and distinct physical paths.

* * * * *

UNITED STATES PATENT AND TRADEMARK OFFICE
CERTIFICATE OF CORRECTION

| | | |
|---|---|---|
| PATENT NO. | : 8,031,589 B2 | Page 1 of 1 |
| APPLICATION NO. | : 11/087938 | |
| DATED | : October 4, 2011 | |
| INVENTOR(S) | : Michael Guess et al. | |

It is certified that error appears in the above-identified patent and that said Letters Patent is hereby corrected as shown below:

Column 5, Line 58, delete "can compartmentalized" and insert --can be compartmentalized--, therefor.

Column 5, Line 60, delete "loop, it. is" and insert --loop, it is--, therefor.

Column 10, Line 46, delete "or 2) the ARP" and insert --or the ARP--, therefor.

Column 11, Line 28, delete "Dispersion is occurs" and insert --Dispersion occurs--, therefor.

Signed and Sealed this
Fifth Day of June, 2012

David J. Kappos
*Director of the United States Patent and Trademark Office*